United States Patent

Tuhro et al.

[15] 3,668,409

[45] June 6, 1972

[54] SCANNER/DECODER MULTIPLEX SYSTEM

[72] Inventors: Richard H. Tuhro, Bedford; Christos B. Kapsambelis, Canton, both of Mass.

[73] Assignee: Computer Indentics Corporation, Westwood, Mass.

[22] Filed: Feb. 26, 1971

[21] Appl. No.: 119,105

[52] U.S. Cl.....................................250/236, 178/7.6, 246/2, 250/220 R, 340/146.3 K

[51] Int. Cl.....................H01j 39/12, G06k 9/00, H04n 3/28

[58] Field of Search..............178/7.6, DIG. 23; 235/61.11 E; 246/2, 2 E, 2 S; 250/234, 199, 235, 236; 340/146.3 K; 350/7

[56] References Cited

UNITED STATES PATENTS

| | | | |
|---|---|---|---|
| 3,417,231 | 12/1968 | Stites et al. | 235/61.11 E |
| 3,443,072 | 5/1969 | Mori | 340/146.3 K |
| 3,443,110 | 5/1969 | Kelsall | 250/236 X |
| 3,456,997 | 7/1969 | Stites et al. | 350/7 |
| 3,521,074 | 7/1970 | Frobese | 250/236 X |
| 3,530,433 | 9/1970 | Kapsambelis | 235/61.11 E X |
| 3,571,571 | 3/1971 | Kapsambelis | 235/61.11 E |

*Primary Examiner*—Stanley D. Miller, Jr.
*Assistant Examiner*—L. N. Anagnos
*Attorney*—Joseph S. Iandiorio and Dos T. Hatfield

[57] ABSTRACT

A time division multiplex optical scanning system is disclosed capable of sampling a number of optical scanners, each of which scans at a predetermined scan rate including a plurality of scanners each including a rotatable support means having a plurality of reflective members disposed about its periphery for scanning an object as the support means rotates; and means for rotating the rotatable support means in a predetermined phase relationship with the rotatable support means of each of the other ones of the scanners for enabling the scanners to scan one at a time in sequence; means responsive to radiation reflected from the members for producing an electrical signal that is a function of the reflected radiation; means for generating time frames at a rate equal to the scan rate, each frame having a predetermined number of time slots equal to the number of scanners capable of being sampled; and means responsive to the means for generating for sampling the electrical signal from each of the scanners during successive ones of the time slots during each frame.

18 Claims, 8 Drawing Figures

RICHARD H. TUHRO
CHRISTOS B. KAPSAMBELIS
INVENTORS.
BY
Joseph S. Iandiorio
ATTORNEY.

RICHARD H. TUHRO
CHRISTOS B. KAPSAMBELIS
INVENTORS
BY
Joseph S. Iandiorio
ATTORNEY RICHARD H. TUHRO
CHRISTOS B. KAPSAMBELIS
INVENTORS.
BY
Joseph S. Iandiorio
ATTORNEY.

RICHARD H. TUHRO
CHRISTOS B. KAPSAMBELIS
INVENTORS.
BY
Joseph S. Iandiorio
ATTORNEY.

SCANNER/DECODER MULTIPLEX SYSTEM

FIELD OF INVENTION

This invention relates to a time division multiplex optical scanning system and more particularly to such a system capable of sampling the outputs from a number of optical scanners, each of which scans at a predetermined scan rate.

BACKGROUND OF INVENTION

Certain types of optical scanners employ a rotatable wheel on whose periphery is disposed a number of mirrors which sequentially scan a particular area as the wheel is rotated. Such a scanner is used in the Automatic Car Identification system adopted by the American Association of Railroads (AAR) to read coded labels attached to the sides of railroad cars. These labels are used by every AAR member to identify its cars so that virtually every railroad car in North America carries such a label. The label carries coded information such as the type, owner, and serial number of the car which is automatically scanned by the scanner as the car passes the trackside location of the scanner. The information so scanned is forwarded to a complex electronic decoder processor for decoding and the decoded information is then printed out or otherwise made available to a human operator or subsequent machines such as a computer. Naturally the labels must be standardized so that they are all of the same size and shape and contain the coded information in the same format or havoc would result. Thus each reading system including the optical scanner are also standardized. The scanners used in these AAR systems employ a wheel which contains twelve mirrors disposed contiguously about the periphery of the wheel which is rotated at 1,200 R.P.M. This combination of speed and mirrors develops a scan rate of 14,400 scans per minute which is fast enough to provide at least three scans of any label passing the scanner even if the car is traveling at 80 miles an hour, the maximum expected speed on high speed stretches of road. In populace areas and in railroad yards where the cars rarely exceed forty miles an hour this scan rate is more than sufficient. Presently, each of these systems includes one such scanner and one decoder processor. Every scanner must have its own decoder. These decoder processors are a major portion of the cost of these highly expensive systems which represent a substantial expense to the already overburdened railroads.

SUMMARY OF INVENTION

It is therefore an object of this invention to provide a time division multiplex optical scanning system for enabling a number of optical scanners to be used with only one decoder processor.

It is a further object of this invention to provide such a time division multiplex optical scanning system which is particularly adapted for enabling a number of optical scanners to be used with only one decoder processor in an AAR system.

It is a further object of this invention to provide such a time division multiplex optical scanning system which enables the use of a number of optical scanners with only one decoder processor in an AAR system while maintaining AAR performance specifications.

It is a further object of this invention to provide a time division multiplex optical scanning system for sampling a number of synchronized optical scanners.

This invention features a time division multiplex optical scanning system capable of sampling a number of optical scanners each of which scans at a predetermined scan rate. There are a plurality of scanners each including rotatable support means having a plurality of reflective members disposed about its periphery for scanning an object as the support means rotates and means for rotating the rotatable support means in a predetermined phased relationship with the rotatable support means of each of the other ones of the scanners for enabling the scanners to scan, one at a time, in sequence. Means, responsive to radiation reflected from the members produces an electrical signal that is a function of the reflected radiation. There are means for generating time frames at a rate equal to the scan rate, each frame having a predetermined number of time slots equal to the number of scanners capable of being sampled by the system. Means, responsive to the means for generating, sample the electrical signal from each of the scanners during successive ones of the time slots during each frame.

DISCLOSURE OF PREFERRED EMBODIMENT

Other objects, features and advantages will occur from the following description of a preferred embodiment and the accompanying drawings, in which.

Figure 1:
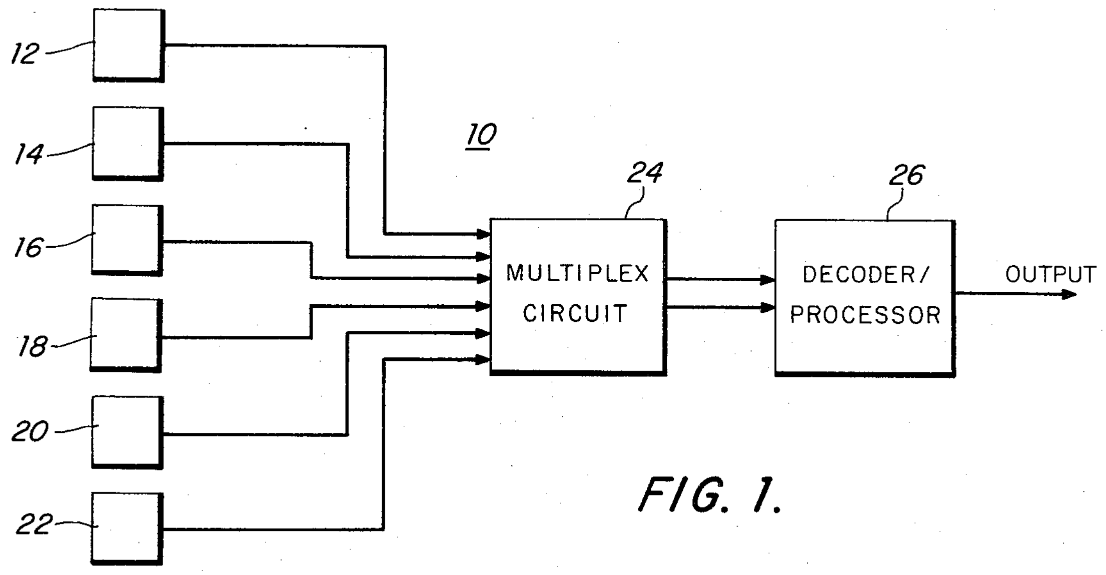
FIG. 1 is a block diagram of a time division multiplex optical scanning system according to this invention in which a plurality of optical scanners are serviced by one decoder processor.

There is shown in FIG. 1 a multiplexing system 10 according to this invention including a plurality of optical scanners 12, 14, 16, 18, 20 and 22 which are sampled by a multiplex circuit 24 to be sequentially serviced by a single decoder processor 26. Multiplex circuit 24 establishes a time frame having a number of time slots generally equal in number to the number of scanners to be sampled. In the embodiment pictured in FIG. 1, therefore, there would be six time slots per frame corresponding to the six scanners. Each scanner is assigned to a specific time slot and has its output sampled by multiplex circuit 24 once each frame during its assigned time slot so that each scanner is sampled once during each time frame and decoder processor 26 processes the output from each scanner once each time frame. The time frame established by multiplex circuit 24 is flexible and may be tailored to meet requirements for any specific application of the system.

For example, in the systems used by the AAR, the timing must be such that there is provided a minimum of three scans of a 6 inch wide label carried by a railroad car passing the scanner at up to 80 miles per hour. This set of conditions requires that there must be a scan approximately every 4.1 milliseconds. In the present AAR system this is achieved by a conventional scanner 30, FIG. 2, including a wheel 32 having twelve reflecting surfaces 34 contiguously arranged about its periphery. Wheel 32 is mounted on shaft 36 which is rotated in the counter clockwise direction at 1,200 R.P.M. by motor 38. Partially reflecting mirror 44 reflects a beam 42 of light from light source 40 to the periphery of wheel 32 in the area proximate aperture 46 in front wall 48 of the housing of scanner 30. As any particular one of reflective surfaces 34 begins to intercept beam 42, it reflects beam 42' through aperture 46. As a reflective surface 34 just begins to intercept beam 42, it reflects beam 42' along path 50, the lower boundary of the scan. As that reflective surface continues to move through beam 42 because of the rotation of wheel 32 by motor 38 and reflected beam 42' moves farther and farther away from path 50 until finally, when that reflective surface 34 is leaving beam 42, the reflected beam 42' reaches the position of path 52. During its sweep from the position of path 50 to the position of path 52, the reflected beam 42' has swept through the scan angle $\theta$.

As reflected beam 42' scans upwardly on an object such as railroad car 54 containing AAR label 56, a return beam 58 returns along approximately the same path as reflected beam 42' so that it strikes the same reflective surface in the same place and is reflected down to partially reflecting mirror 44 which is effective to transmit light coming in the direction of return beam 58 to photoelectric cell and other circuits 60 which in turn provides a signal to a decoder processor. To meet further requirements of the AAR scanner 30 is required to scan approximately nine feet in the vertical position at approximately 9 feet from the scanner. The 9-foot vertical sweep is required by the AAR to accommodate the various heights above the track that a label may be placed on a railroad car. In addition the reflective material used to construct the labels works well only up to about 60° reflection angle. This 9 foot scan and 60° or less reflection angle results in a scan pattern defined by the isosceles triangle constituted by paths 50, 52 and the side of car 54, FIG. 2, with the scan angle $\theta$ equal to approximately 60°. With the type of scanning apparatus provided in scanner 30 wherein a reflective surface 34 moves through a light beam 42 to provide a scan the reflected surface need move through an angle only one-half the size of the angle required for the scan. This is so because every one degree of rotation of the reflective surface intercepting beam 42 also changes the angle of incidence of beam 42 by 1°. Since the angle of incidence of beam 42 changes by 1°, the angle of reflection of beam 42' also changes by one degree so that the total change between beam 42 and reflected beam 42' is two degrees.

Figure 3:
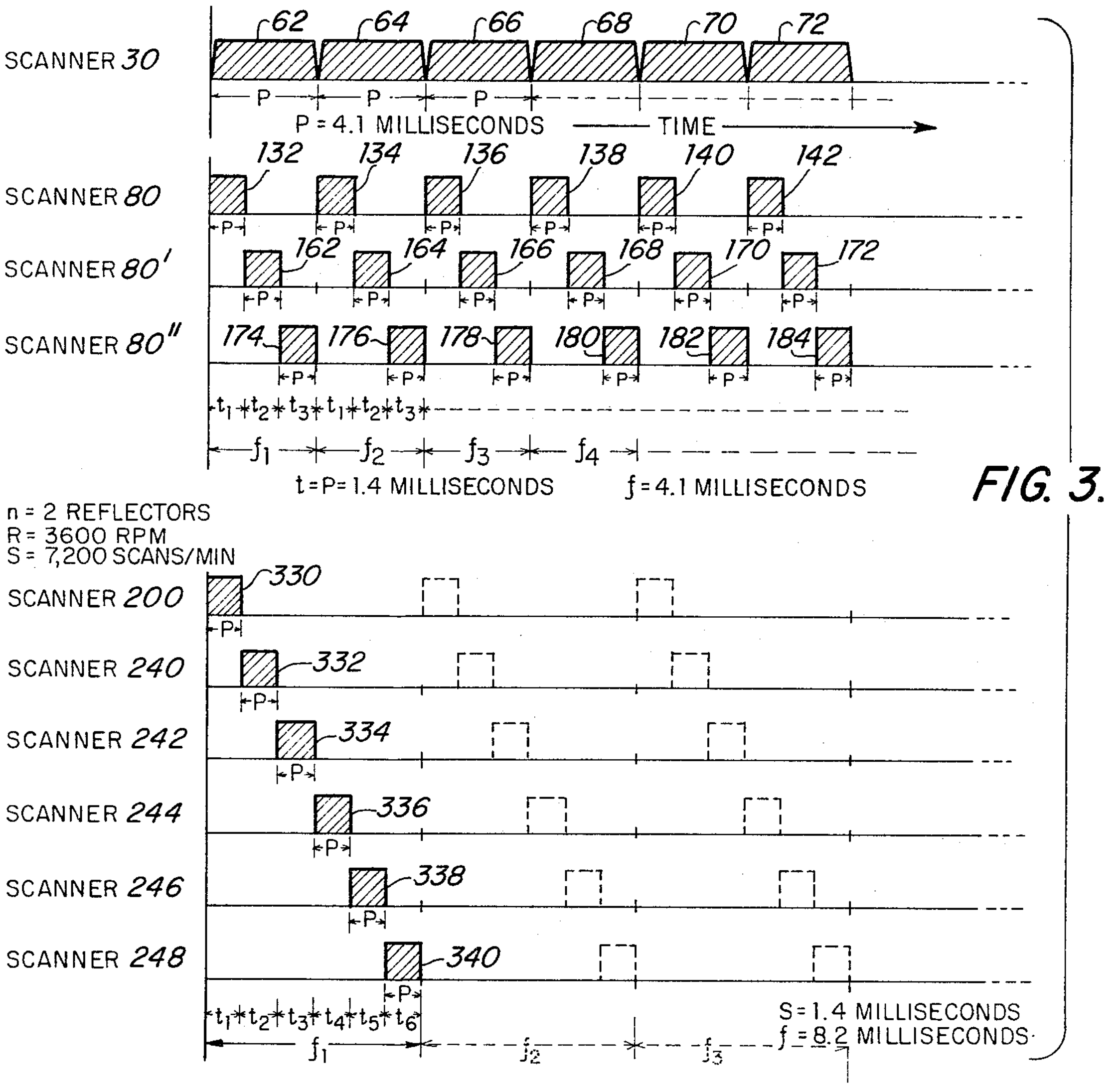
FIG. 3 is a timing chart showing the relationship of certain parameters in the scanner of FIG. 2 and of the scanner systems shown in FIGS. 4 and 5 and FIGS. 6 and 7.

Thus, for every degree of rotation of the reflective surface 34 there is 2° of sweep imposed upon reflected beam 42'. Therefore for scan angle $\theta$ the reflective surface need only be moved through the angle $\alpha$ equal to one-half $\theta$. Thus, in this case where $\theta$ is 60° $\alpha$ is 30°. The wheel 32 is scanner 30 is specifically designed, therefore, so that each reflective surface 34 rotates through an angle of 30° as it moves through beam 42. This is effected simply by providing twelve reflective surfaces 34 such that each one occupies one-twelfth or 30° of the periphery of wheel 32. As wheel 32 with twelve reflective surfaces 34 is rotated by motor 38 at 1,200 R.P.M. a scan rate S of 14,400 scans per minute or one scan per 4.1 milliseconds is generated. This relationship may be expressed simply as S = R(N) where S is the scan rate, R is the speed of rotation of the wheel and N is the number of reflective surfaces on the wheel. In scanner 30, since the 12 reflective surfaces 34 are contiguous, the scans occur at a scan rate S of one scan every 4.1 milliseconds, each scan extending for a period P of 4.1 milliseconds, as shown in FIG. 3 where a series of scans is shown by shaded blocks 62, 64, 66, 68, 70, 72.

Figures 2, 4, 6:
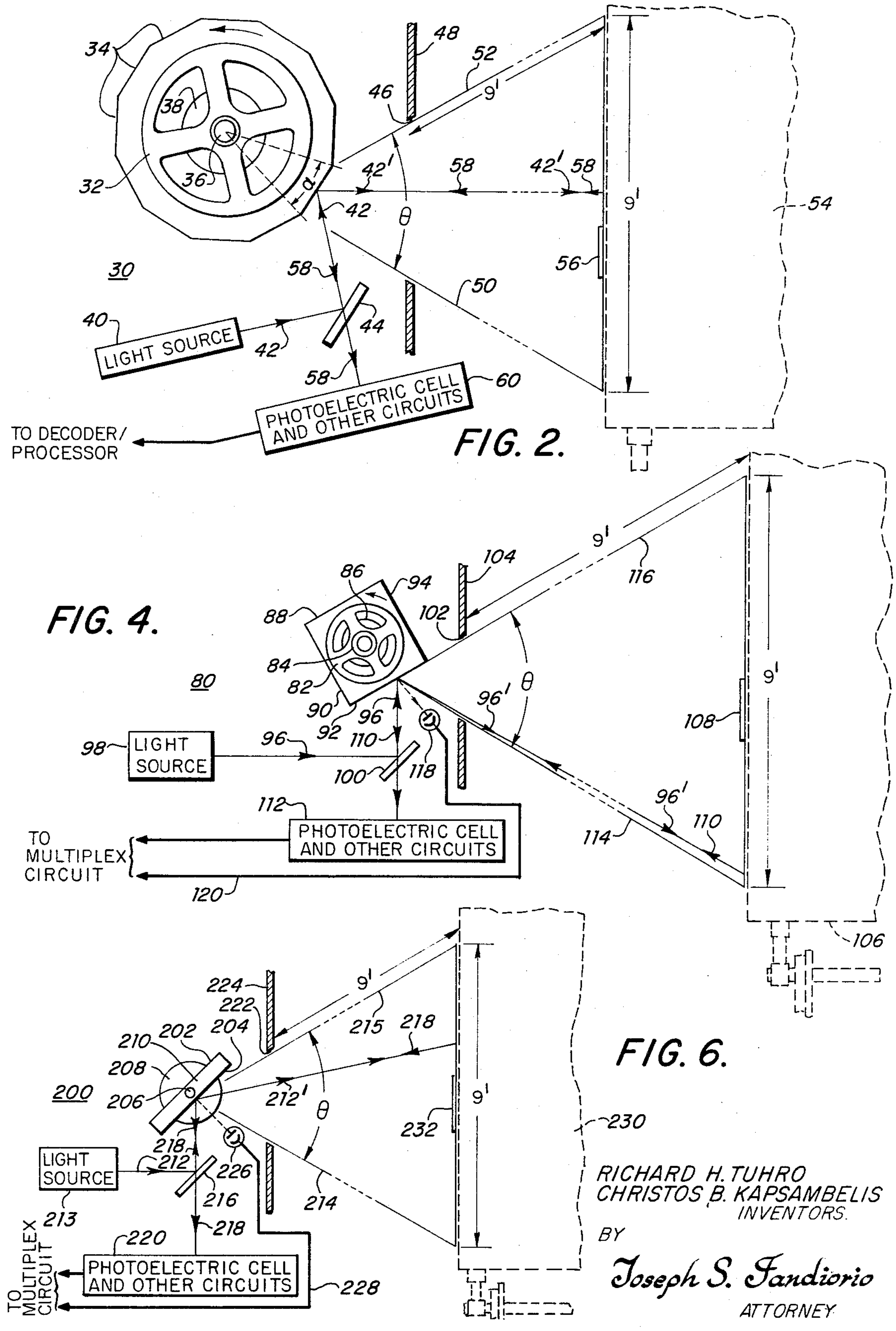
FIG. 2 is a schematic diagram of a portion of a conventional prior art scanner such as used in the AAR systems.
FIG. 4 is a schematic diagram of an optical scanner according to this invention.
FIG. 6 is another optical scanner according to this invention.

A scanner 80 which meets the same requirements as scanner 30 with respect to scan angle and scan rate and which is useable in the time division multiplex optical scanning system according to this invention is shown in FIG. 4. Scanner 80 includes a wheel 82 mounted on shaft 84 rotated by motor 86 in the counter clockwise direction. Wheel 82 carries, contiguously mounted about its periphery, four reflective surfaces 88, 90, 92 and 94. Scanner 80 operates similarly to scanner 30. A light beam 96 from light source 98 reflects from partially reflecting mirror 100 and strikes one of the reflective surfaces 92 which directs reflected beam 96' through aperture 102 in the front wall 104 of scanner 80. Reflected beam 96' is returned from the railroad car 106 carrying AAR label 108 and the return beam 110 travels back essentially along the same path as reflected beam 96' and strikes reflecting surface 92 which directs the return beam 110 to partially reflecting mirror 100. Partially reflecting mirror 100 responds to light coming in the direction of return beam 110 to transmit it to the photoelectric cell and other circuits 112 which provides to the multiplex circuit an electrical output representative of the return beam.

At the beginning of each scan the reflected beam 96' lies along path 114, the lower boundary of the scan, and at the end of each scan, reflected beam 96' is approximately coincident with path 116 at the upper boundary of the scan so that scan angle $\theta$ of approximately sixty degrees is swept by the reflected beam 96'. Just prior to the beginning of each scan when reflected beam 96' aligns with path 114 the reflected beam 96' encounters photoelectric cell 118 inside the scanner housing which produces a scan-begin signal on line 120 to be submitted to the multiplex circuit 24. Since in scanner 80 the number of reflective surfaces has been reduced to one-third, N = 4, of those contained in scanner 30 the speed of rotation of wheel 82 must be tripled in order to compensate and maintain the scanning rate at 14,400 scans per minute or one scan every 4.1 milliseconds. In terms of the expression S = R(N), S = 3,600 (4), S = 14,400 scans per minute, or one scan every 4.1 milliseconds.

Each of reflective surfaces 88, 90, 92, 94 occupies one-quarter or 90° of wheel 82. Thus since the angle $\alpha$ need be only 30° or one-third of the rotation angle of each surface 88, 90, 92, 94 to produce the 60° scan angle $\theta$, the other two-thirds or 60° of rotation of each of these surfaces is unused.

Thus, although in scanner 80 wheel 82 is rotated at 3,600 R.P.M. in order to maintain the scan rate of 14,400 scans per minute or one scan every 4.1 milliseconds the scan period P is no longer equal to 4.1 milliseconds but equal to only one-third of that or approximately 1.4 milliseconds. A series of scans represented by shaded blocks 132, 134, 136, 138, 140, 142 is shown in FIG. 3, where it can be seen that the scans still occur at the rate, S, of one every 4.1 milliseconds, but that the period, P, of each scan has been reduced to one-third, or 1.4 milliseconds.

Figure 5:
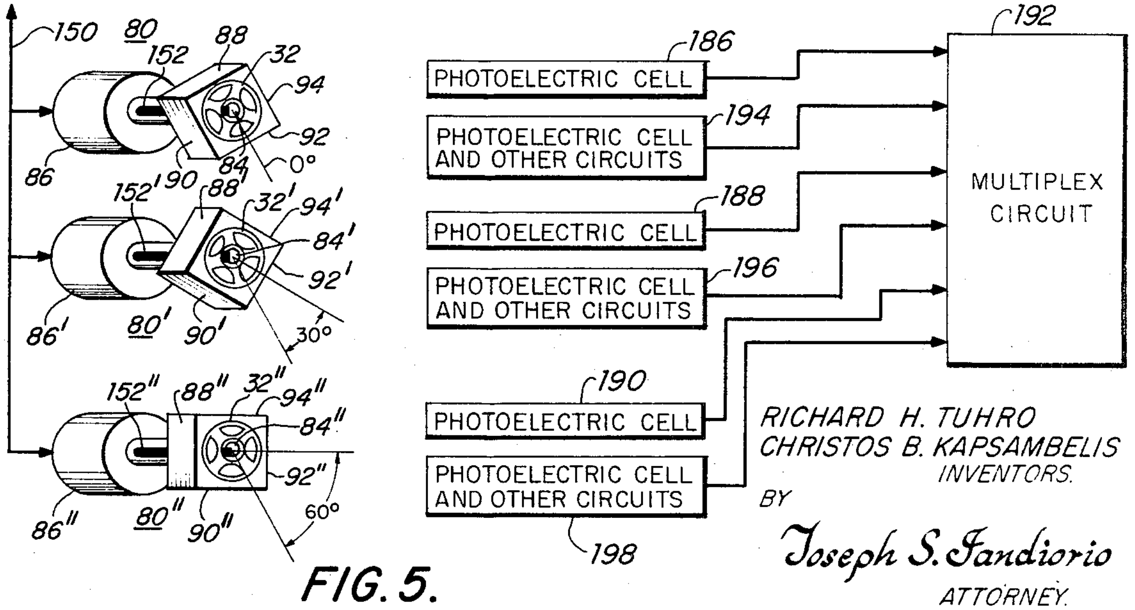
FIG. 5 is a diagram showing three scanners such as shown in FIG. 4 arranged in a multiplexing system according to this invention.

Scanner 80 may be combined with two identical scanners 80', 80'', FIG. 5, to form a time division multiplex optical scanning system according to this invention. In FIG. 5 parts of scanners 80', 80'' that are identical with parts of scanner 80 have been given the same reference numbers primed and double primed, respectively. Motors 86, 86' and 86'' are synchronous motors all energized by the same power source on line 150 to insure that the motors remain in synchronism. Other means may also be used to provide the proper synchronization of the motors. Wheel 32 with reflective surfaces 88, 90, 92 and 94 is fixed to shaft 84 by key means 152. Wheel 32' having reflective surfaces 88', 90', 92' and 94' is fixed to shaft 84' by key means 152' in the position rotated 30° counter clockwise from the position of wheel 32 with respect to shaft 84. Wheel 32'' having reflective surfaces 88'', 90'', 92'' and 94'' is fixed to shaft 84'' by key means 152'' in a position rotated 60° from the position of wheel 32 with respect to shaft 84. Thus, wheels 32, 32' and 32'' of scanners 80, 80', 80'' have a phased relationship to one another of 30° and that relationship will be maintained by the synchronous operation of motors 86, 86' and 86''.

The relationship of scanners 80, 80' and 80'' may be better understood with reference to FIG. 3 wherein a timing scheme using frames and time slots in the language of the multiplexing art has been imposed on the operations of scanners 80, 80' and 80''. Each frame $f$ extends for approximately 4.1 milliseconds and includes three time slots, $t_1$, $t_2$, $t_3$, each of which extends for approximately 1.4 milliseconds. Thus the frame rate F is one frame per 4.1 milliseconds which is equal to the scan rate S and the duration of a time slot, $t$, 1.4 milliseconds, is equal to the time period P of the scans 132, 134, 136, 138, 140, 142 of scanner 80.

Scanner 80' provides a series of scans 162, 164, 166, 168, 170, 172, each having a scan period P equal to 1.4 milliseconds. Scanner 80'' produces a similar series of scans 174, 176, 178, 180, 182, 184. Scanner 80 produces a scan 132 extending for a period P during the first time slot $t_1$ of frame $f_1$. Scanner 80' produces a scan 162 extending for a period P during the second time slot $t_2$ of frame $f_1$. And scanner 80'' provides a scan 174 for a period P during the third time slot $t_3$ of frame $f_1$. Then scanner 80 provides scan 134 extending for a period P during the first time slot $t_1$ of the second frame $f_2$. Scanner 80' provides a scan 164 extending for a period P during the second time slot $t_2$ of the second frame $f_2$, and scanner 80'' provides a scan 176 extending for a period P during the third time slot $t_3$ of the second frame $f_2$ and so on, so that each frame is made up of three time slots, each of which time slots is filled by a scan from a different one of scanners 80, 80', and 80'', respectively, each of which scans extends for a period P equal to 1.4 milliseconds.

In this manner each of scanners 80, 80' and 80'' is enabled to scan once every 4.1 milliseconds in compliance with the requirements of the AAR system standards but each scanner scans for a period equivalent to only one-third of 4.1 milliseconds so that time is provided in which two other scanners may also scan and maintain the required scan rate S of one scan per 4.1 milliseconds. Three photoelectric cells 186, 188 and 190 indicate to the multiplex circuit 192 when their respective scanner 80, 80', 80'' is beginning a scan to enable multiplex circuit 192 to then respond to the outputs from photoelectric cell and other circuits 194, 196 and 198, respectively, which derive their outputs from their associated scanners 80, 80', 80'', respectively.

Another scanner 200, FIG. 6, according to this invention includes only two reflective surfaces 202, 204. Scanner 200 does not require a wheel as a support structure for reflective surfaces 202 and 204. The substance of the reflective surfaces themselves may function as the support structure 210 and may be mounted directly on shaft 206 which is rotated in a counter clockwise direction by motor 208. Since in scanner 200 N is equal to two, R must be equal to 7,200 R.P.M. in order to maintain a scanning rate of 14,400 scans per minute or one scan every 4.1 milliseconds. However, in a particular application of this embodiment, hereinafter explained, that requirement is not adhered to. Motor 208 is driven at 3,600 R.P.M., not 7,200 R.P.M. to provide a scanning rate which is one-half the required scanning rate of 14,400 scans per minute or 7,200 scans per minute: one scan every 8.2 milliseconds. This slower scan rate equal to one-half the scan rate required by the AAR system standard is fully operative to give the necessary minimum of three scans of a 6-inch wide label attached to a railroad car as it passes a scanner provided that the railroad car does not exceed 40 miles per hour, one-half the speed used as a basis for setting the required scan rate.

This limitation of a 40 miles per hour maximum speed for the use of the particular scanner 200 shown in FIG. 6 is workable limitation because in the areas where a multiplicity of scanners is required such as a railroad yard, the speed of the trains generally will not exceed the 40 mile per hour limit and will rarely exceed even 20 miles an hour. Thus the full measure of savings provided by this invention may be realized without reducing the reliability criteria of the AAR system standards.

As support structure 210 is rotated by motor 208, it intercepts light beam 212 coming from light source 213 reflected by partially reflecting mirror 216 and sweeps the reflected beam 212' between paths 214 and 215 producing a scan angle $\theta$ equal to 60°. The return beam 218 returns along the same path as reflected beam 212', strikes the reflective surface in effectively the same place and is reflected to partially reflecting mirror 216 which in turn transmits the return beam 218 to the photoelectric cell and other circuits 220 which provide an output to a multiplexer. Just before each scan begins through aperture 222 in the front wall 224 of scanner 200 the reflected beam 212' encounters photoelectric cell 226 which produces a scan-begin signal on line 228 to the multiplex circuit. The scanner 200 produces the same 9 foot vertical scan of a railroad car 230 carrying an AAR label 232 at nine feet distance from the scanner as the previous scanners; however, since the angle $\alpha$ still need be only 30° in order to provide a scan angle $\theta$ of 60°, only one-sixth of the 180° scan produced by each of surfaces 202, 204 is used. The remaining five-sixths of the 180° provide no useful scan through aperture 222; thus for each rotation of structure 210 there are two useful scans produced and for each useful scan produced there is 150° rotation during which time no useful scan is produced. This 150° rotation can be considered as five additional separate 30° rotations, during each of which a useful scan could be made to provide a 60° scan angle.

Figure 7:
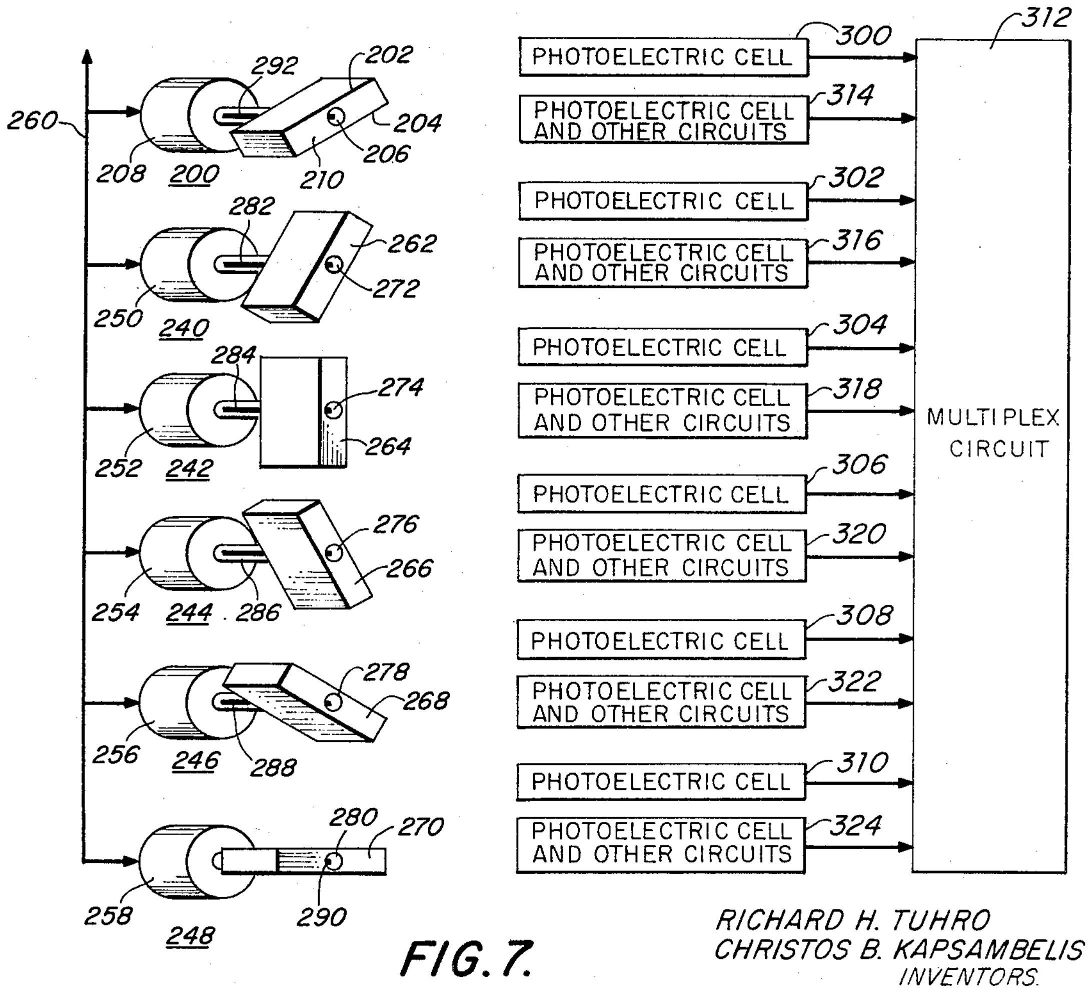
FIG. 7 is a diagram of six optical scanners such as shown in FIG. 6 arranged in a multiplexing system according to this invention.

This is accomplished by combining scanner 200 with five identical scanners 240, 242, 244, 246, and 248, FIG. 7, each of which contains a synchronous motor 250, 252, 254, 256 and 258 identical with synchronous motor 208. All of the motors are connected to the same power source on line 260 to insure that all the motors will remain in phase. Support structure 210 is fixed to shaft 206 by keying means 290. Each of motors 250, 252, 254, 256, 258 carries a support structure 262, 264, 266, 268 and 270 fixed to shafts 272, 274, 276, 278 and 280 by keying means 282, 284, 286, 288 and 290, respectively. Structure 262 of scanner 240 is fixed to shaft 272 in a position rotated 30° counter clockwise from that of structure 210. Structure 264 of scanner 242 is fixed to shaft 274 in a position rotated 60° counter clockwise relative to structure 210. Structure 266 is fixed to shaft 276 in a position rotated 90° counter clockwise from structure 210. Structure 268 of scanner 246 is fixed to shaft 278 in a position rotated 120° counter clockwise from structure 210 and structure 270 is fixed to shaft 280 in a position rotated 150° counter clockwise from structure 210. Thus after scanner 200 has completed its 30° of rotation ($\alpha$) that produces the 60° scan, scanner 248 will begin its scan. Then after 60° of rotation when scanner 248 has completed its 60° ($\theta$) scan scanner 246 will begin its scan, and so on. Photoelectric cells 300, 302, 304, 306, 308, 310 provide scan-begin signals for each of their respective scanners 200, 240, 242, 246, 248 to multiplex circuit 312 as each of their respective scanners 200, 240, 242, 248 begins a scan. Photoelectric cells and other circuits 314, 316, 318, 320, 322 and 324 provide to multiplex circuit 312 electrical signals representative of the scans produced by each of their respective scanners 200, 240, 242, 246, 248.

The system of FIG. 7 may be better understood with reference to FIG. 3 wherein scanner 200 provides a scan 330 having a period P of 1.4 milliseconds during the first time slot $t_1$ of each frame $f$; scanner 240 provides a scan 332 having a period P of 1.4 milliseconds during the second time slot $t_2$ of each frame $f$; scanner 242 provides a scan 334 having a period P of 1.4 milliseconds during the third time slot $t_3$ of each frame $f$; scanner 244 provides a scan 336 having a period P of 1.4 milliseconds during the fourth time slot $t_4$ of each frame $f$; scanner 246 provides a scan 338 having a period P of 1.4 milliseconds during the fifth time slot $t_5$ of each frame $f$; and scanner 248 provides a scan 340 of period P during the sixth time slot $t_6$ of each frame $f$. The system operates in this manner at the rate of 7,200 frames per minute.

Figure 8:
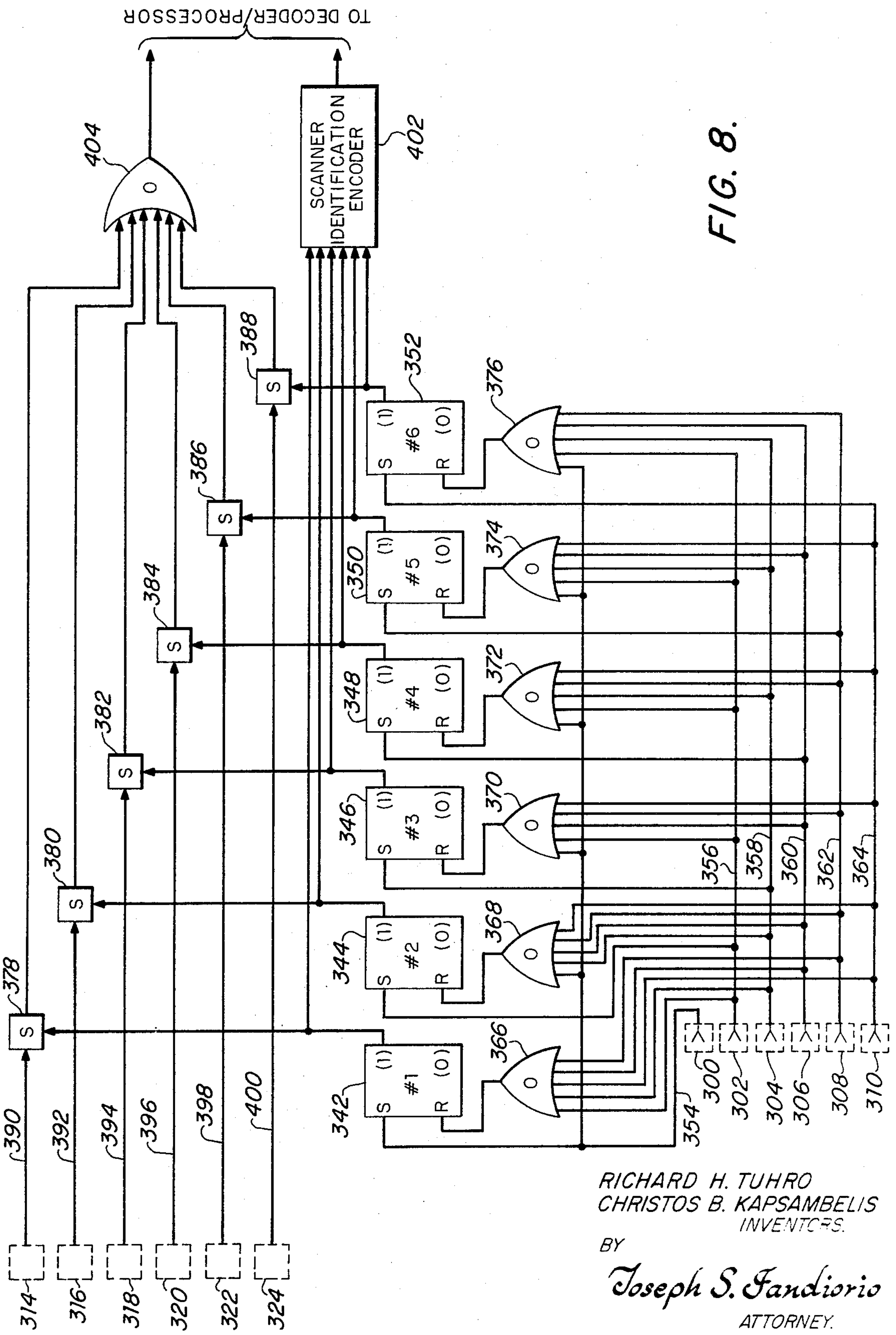
FIG. 8 is a more detailed diagram of the multiplex circuit of FIG. 7.

A more detailed description of multiplex circuit 312 is shown in FIG. 8. Multiplex circuit 312 includes six flip-flops 342, 344, 346, 348, 350 and 352 corresponding to scanners 200, 240, 242, 244, 246 and 248, respectively. Flip-flops 342, 244, 346, 348, 350 and 352 are set by scan-begin signals provided on lines 354, 356, 358, 360, 362 and 364 by photoelectric cells 302, 304, 306, 308 and 310, all respectively. Flip-flops 342, 244, 346, 348, 350, 352 are reset by a signal from their associated OR gates 366, 368, 370, 372, 374 and 376, respectively, each of which is energized by any one or more of the lines 354, 356, 358, 360, 362 and 364 except the one of those lines which provides the set input of the flip-flop associated with that OR gate. Thus, flip-flop 342 is set by a signal on line 354 and is reset through OR gate 366 by a signal on any of lines 356, 358, 360, 362 and 364. Similarly, flip-flop 344 is set by signal on line 356 and is reset through OR gate 368 by a signal on any of lines 354, 358, 360, 362 and 364 and so on. A set output from flip-flop 342, 344, 346, 348, 350, 352, enables its associated switch 378, 380, 382, 384, 386, 388, respectively, to pass to OR gate 404 the signal at that switch's input on line 390, 392, 394, 396, 398 and 400, respectively, provided by photoelectric cell and other circuits 314, 316, 318, 320, 322 and 324, respectively. The outputs of the flip-flops 342, 344, 346, 348, 350 and 352 are also provided to scanner identification encoder 402 which responds to the one of the flip-flops that is in the set condition to identify the scanner associated with that flip-flop as the scanner whose output is presently supplied to OR gate 404.

Thus, in operation, when scanner 200 begins a scan, a signal appears on line 354 which sets flip-flop 342 and resets the rest of the flip-flops. The set output from flip-flop 342 indicates to scanner identification encoder 402 that it is scanner 200 that is now performing the scan and so scanner 200 is identified to the decoder processor by scanner identification encoder 402. Simultaneously, the set output from flip-flop 342 is supplied to switch 378 to enable the input generated by photoelectric cell and other circuits 314 appearing on line 390 to be passed by switch 378 to OR gate 404 which in turn passes the signal to the decoder processor for further operations. The circuit described in FIG. 8 can be expanded to accommodate any number of multiplex inputs or can be reduced to accommodate a lesser number of multiplex inputs; for example, only half of the flip-flops, OR gates and switches in FIG. 8 would be necessary to implement the multiplex circuit 192 of FIG. 5 which uses scanner 80 of FIG. 4.

Other embodiments will occur to those skilled in the art and are within the following claims.

What is claimed is:

1. A time division multiplex optical scanning system capable of sampling a number of optical scanners each of which scans at a predetermined scan rate comprising:

- a plurality of scanners each including rotatable support means having a plurality of reflective members disposed about its periphery for scanning an object as said support means rotates;
- means for rotating said rotatable support means in a predetermined phased relationship with the rotatable support means of each of the other ones of said scanners for enabling said scanners to scan one at a time in sequence;
- means, responsive to radiation reflected from said members, for producing an electrical signal that is a function of the reflected radiation;
- means for generating time frames at a rate equal to the scan rate, each frame having a predetermined number of time slots equal to the number of scanners capably of being sampled; and
- means, responsive to said means for generating, for sampling the electrical signal from each of the scanners during successive ones of said time slots during each frame.

2. The time division multiplex optical scanning system of claim 1 in which said means for generating time frames includes a scan sensor associated with each of said scanners for indicating when its scanner is scanning.

3. The time division multiplex optical scanning system of claim 2 in which said means for generating time frames further includes means, associated with each of said scan sensors, for indicating that a scan is in progress at the corresponding said scanner.

4. The time division multiplex optical scanning system of claim 3 further including means in which said means, responsive to said scan sensors for inhibiting each of said means for indicating except the one associated with the scanner in which a scan is in progress.

5. The time division multiplex optical scanning system of claim 3 in which said means for sampling includes switching means each associated with one of said scanners and responsive each to the corresponding one of said means for indicating.

6. The time division multiplex optical scanning system of claim 3 further including encoder means, responsive to said means for indicating, for producing a code identifying the scanner whose scan is in progress.

7. The time division multiplex optical scanning system of claim 1 in which said rotatable support means is a wheel.

8. The time division multiplex optical scanning system of claim 1 in which said reflective members are mirrors.

9. The time division multiplex optical scanning system of claim 1 in which said means for rotating includes a motor.

10. The time division multiplex optical scanning system of claim 9 in which said motor is a synchronous motor and the synchronous motor in each of said scanners is energized from the same power source.

11. The time division multiplex optical scanning system of claim 1 in which said means for producing an electrical signal includes a photo-sensitive device.

12. The time division multiplex optical scanning system of claim 1 in which there are four said reflective members, there are three time slots per frame and the system is capable of multiplexing three scanners.

13. The time division multiplex optical scanning system of claim 1 in which there are two said reflective members, there are six time slots per frame and the system is capable of multiplexing six scanners.

14. The time division multiplex optical scanning system of claim 1 in which said reflective members are arranged contiguously about the periphery of said support means.

15. A time division multiplex optical scanning system capable of sampling a number of optical scanners each of which scans at a predetermined scan rate S, comprising:

- a plurality of scanners each including rotatable support means having N reflective members disposed about its periphery for scanning an object over an angle $\theta$ as said support means rotates through an angle $\alpha=\theta/2$; and means for rotating said rotatable support means at a speed R in predetermined phased relationship with the rotatable support means of each of the other ones of said scanners for enabling said scanners to scan one at a time in sequence;
- means, responsive to radiation reflected from said members, for producing an electrical signal that is a function of the radiation;
- means for generating time frames at a rate F equal to the scan rate S, each frame having a number of time slots $t$ equal in number to the number of scanners capable of being sampled; and
- means, responsive to said means for generating, for sampling the electrical signal from each of the scanners during successive ones of said time slots during each frame.

16. The system of claim 15 in which said reflective members are arranged contiguously about the periphery of said support means and the number of available time slots $t$ equals $360/N\alpha$.

17. A time division multiplex optical scanning system capable of sampling up to three optical scanners, each of which scans at a scan rate of 14,400 scans per minute comprising:

- a plurality of scanners each including rotatable support means having four reflective members disposed contiguously about its periphery for scanning an object as said support means rotates;
- means for rotating said rotatable support means at 3,600 R.P.M. in a predetermined phase relationship with the rotatable support means of each of the other ones of said scanners which also are rotated at 3,600 R.P.M. for enabling said scanners to scan one at a time in sequence;
- means responsive to radiation reflected from said members for producing an electrical signal that is a function of the reflected radiation;
- means for generating time frames at a rate equal to the scan rate, each frame having three time slots; and
- means responsive to said means for generating for sampling the electrical signals from each of the scanners during successive ones of said time slots during each frame.

18. A time division multiplex optical scanning system capable of sampling six optical scanners, each of which scans at a scan rate of 7,200 scans per minute comprising:

- a plurality of scanners each including rotatable support means having two reflective members disposed on it for scanning an object as said support means rotates;
- means for rotating said rotatable support means at 3,600 R.P.M. in a predetermined phase relationship with the rotatable support means of each of the other ones of said scanners which are also rotating at 3,600 R.P.M. for enabling said scanners to scan one at a time in sequence;

means responsive to radiation reflected from said members for producing an electrical signal that is a function of the reflected radiation;

means for generating time frames at a rate equal to the scan rate, each frame having six time slots; and means responsive to said means for generating for sampling the electrical samples from each of the scanners during successive ones of said time slots during each frame.

* * * * *